(12) United States Patent
Sun et al.

(10) Patent No.: US 10,593,951 B2
(45) Date of Patent: Mar. 17, 2020

(54) CATHODE FOR METAL-SULFUR BATTERY HAVING CATHODE ACTIVE MATERIAL LAYER CONTAINING N-DOPED CARBON AND PROTECTIVE FILM

(71) Applicant: INDUSTRY-UNIVERSITY COOPERATION FOUNDATION HANYANG UNIVERSITY, Seoul (KR)

(72) Inventors: Yang-Kook Sun, Seoul (KR); Heemin Kim, Seoul (KR)

(73) Assignee: IUCF-HYU (INDUSTRY—UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 111 days.

(21) Appl. No.: 15/619,013

(22) Filed: Jun. 9, 2017

(65) Prior Publication Data
US 2017/0358800 A1    Dec. 14, 2017

(30) Foreign Application Priority Data
Jun. 10, 2016    (KR) .................... 10-2016-0072093

(51) Int. Cl.
*H01M 4/04*    (2006.01)
*H01M 4/62*    (2006.01)
(Continued)

(52) U.S. Cl.
CPC .............. *H01M 4/628* (2013.01); *H01M 4/04* (2013.01); *H01M 4/043* (2013.01);
(Continued)

(58) Field of Classification Search
CPC ...... H01M 4/04; H01M 4/628; H01M 4/0404; H01M 4/0419; H01M 4/043; H01M 4/133;
(Continued)

(56) References Cited

U.S. PATENT DOCUMENTS 9,385,397 B2 *  7/2016  Zhamu .................... H01M 4/38
9,437,370 B2 *  9/2016  Chen ...................... B82Y 30/00
(Continued)

OTHER PUBLICATIONS

Niu et al, A carbon sandwich electrode with graphene filling coated by N-doped porous carbon layers for lithium-sulfur batteries, Journal of Materials Chemistry A 3, 20218-20224. (Year: 2015).*

*Primary Examiner* — Amanda C. Walke
(74) *Attorney, Agent, or Firm* — Sughrue Mion, PLLC

(57) ABSTRACT

Disclosed are a cathode for metal-sulfur batteries which includes a cathode active material layer, which contains nitrogen-doped carbon, and a protective layer and a method of manufacturing the same. The cathode for lithium-sulfur batteries according to the present invention includes a cathode active material layer including a sulfur-containing material, a binder, and a nitrogen-doped carbon material; and a protective layer that is disposed on the cathode active material layer and is composed of a nitrogen-doped carbon material, wherein the nitrogen-doped carbon material of the cathode active material layer has a form wherein spherical particles and linear structures are mixed and the nitrogen-doped carbon material of the protective layer has a linear structure.

6 Claims, 9 Drawing Sheets

(51) Int. Cl.
    *H01M 4/36*      (2006.01)
    *H01M 4/38*      (2006.01)
    *H01M 4/136*     (2010.01)
    *H01M 4/1397*    (2010.01)
    *H01M 4/133*     (2010.01)
    *H01M 10/0525*   (2010.01)
    *H01M 4/02*      (2006.01)

(52) U.S. Cl.
    CPC ....... *H01M 4/0404* (2013.01); *H01M 4/0419* (2013.01); *H01M 4/133* (2013.01); *H01M 4/136* (2013.01); *H01M 4/1397* (2013.01); *H01M 4/364* (2013.01); *H01M 4/366* (2013.01); *H01M 4/38* (2013.01); *H01M 4/382* (2013.01); *H01M 4/622* (2013.01); *H01M 4/625* (2013.01); *H01M 10/0525* (2013.01); *H01M 2004/028* (2013.01)

(58) Field of Classification Search
    CPC .... H01M 4/136; H01M 4/1397; H01M 4/364; H01M 4/38; H01M 4/382; H01M 4/622; H01M 10/052; H01M 4/0525
    USPC .......................................................... 429/217
    See application file for complete search history.

(56) References Cited

U.S. PATENT DOCUMENTS

| | | | | |
|---|---|---|---|---|
| 10,084,182 | B2* | 9/2018 | Pan | H01M 4/364 |
| 2013/0164625 | A1* | 6/2013 | Manthiram | H01M 4/13 |
| | | | | 429/231.8 |
| 2014/0141328 | A1* | 5/2014 | Dai | H01M 4/137 |
| | | | | 429/217 |
| 2016/0172667 | A1* | 6/2016 | Yan | H01M 10/052 |
| | | | | 429/213 |
| 2016/0240840 | A1* | 8/2016 | He | H01M 4/366 |
| 2016/0294000 | A1* | 10/2016 | He | H01M 10/0525 |
| 2016/0351909 | A1* | 12/2016 | Bittner | H01G 11/38 |
| 2017/0222227 | A1* | 8/2017 | Lux | H01M 2/1686 |
| 2018/0232297 | A1* | 8/2018 | Fan | G06F 11/362 |
| 2018/0248189 | A1* | 8/2018 | Pan | H01M 4/622 |
| 2018/0294474 | A1* | 10/2018 | Zhamu | C08K 3/22 |
| 2018/0309130 | A1* | 10/2018 | Dai | H01M 4/137 |
| 2018/0316001 | A1* | 11/2018 | Kim | H01M 4/364 |
| 2018/0323465 | A1* | 11/2018 | Li | H01M 4/38 |
| 2018/0351198 | A1* | 12/2018 | Zhamu | H01M 10/058 |
| 2018/0375156 | A1* | 12/2018 | Zhamu | H01M 10/0569 |
| 2019/0044135 | A1* | 2/2019 | Du | H01M 4/502 |

* cited by examiner

PREPARATION EXAMPLE 5

CATHODE FOR METAL-SULFUR BATTERY HAVING CATHODE ACTIVE MATERIAL LAYER CONTAINING N-DOPED CARBON AND PROTECTIVE FILM

CROSS-REFERENCE TO RELATED APPLICATION

This application claims priority to and the benefit of Korean Patent Application No. 2016-0072093, filed on Jun. 10, 2016, the disclosure of which is incorporated herein by reference in its entirety.

BACKGROUND

1. Field of the Invention

The present invention relates to a metal-sulfur battery, more particularly to a cathode for metal-sulfur batteries.

2. Discussion of Related Art

In accordance with miniaturization, weight reduction, and performance enhancement of electronic products, communication devices, and the like, research into next-generation high-capacity lithium sulfur batteries, which are recently attracting attention, is ongoing.

Such a lithium-sulfur battery is a secondary battery in which a sulfur-based compound having a sulfur-sulfur bond is used as a cathode active material and a carbon-based material, in which alkali metal ions such as lithium ions are intercalated and deintercalated, is used as an anode active material. Such a lithium-sulfur battery stores and generates electrical energy using oxidation-reduction wherein an oxidation number of sulfur is decreased when a bond between sulfur and sulfur is broken during reduction (discharge) and a bond between sulfur and sulfur is formed again when an oxidation number of sulfur increases during oxidation (charge).

FIG. 1 illustrates the structure and reaction mechanism of a conventional lithium sulfur battery.

Referring to FIG. 1, during discharge of the conventional lithium sulfur battery, lithium is oxidized at an anode and sulfur is reduced at a cathode. Here, cyclic $S_8$ of sulfur is converted into linear lithium polysulfide due to reduction. When the lithium polysulfide is completely reduced, lithium sulfide ($Li_2S$) is generated. In this process, the discharge voltage of the lithium sulfur battery is generated.

Sulfur, which is an element used as a cathode active material of such a lithium sulfur battery, has a high energy density compared to the mass thereof, is cheap, and is harmless to the human body. Accordingly, sulfur is known as a very attractive cathode material for secondary batteries.

However, it is difficult to commercialize such a lithium-sulfur battery because, when sulfur, as a nonconductor not having electrical conductivity, is used as an active material, a conductive material for smoothly providing electrochemical reaction sites is required to induce electrochemical reactions. In addition, the lifespan of the lithium sulfur battery is shortened due to high solubility of lithium polysulfide, which is an intermediate product generated during an electrochemical reaction in the lithium sulfur battery, in an organic electrolyte.

Accordingly, to address such problems, research into a method of developing a carbon material, which is a superior conductive material for activating sulfur, and a combination of materials including carbon, or a method of forming a material having a property of adsorbing sulfur in a single film form and adding the same during a battery manufacturing process to delay elution of sulfur is underway.

Korean Patent Application Publication No. KR2012-0135808 discloses a method of preventing elution of polysulfide using a polymer, i.e., polypropylene, treated with polyethylene glycol to form a hydrophilic porous membrane.

However, this method is disadvantageous in that polysulfide elution is not sufficiently prevented when the loading amount of sulfur is increased, and the performance of a battery is also poor.

SUMMARY OF THE INVENTION

Therefore, the present invention has been made in view of the above problems, and it is one object of the present invention to provide a cathode for lithium-sulfur batteries that includes a cathode active material layer, which is able to sufficiently delay elution of sulfur even when a loading amount of the sulfur is increased, and a protective layer.

In accordance with an aspect of the present invention, the above and other objects can be accomplished by the provision of a cathode for lithium-sulfur batteries which includes a cathode active material layer, which contains nitrogen-doped carbon, and a protective layer. The cathode for lithium-sulfur batteries according to the present invention includes a cathode active material layer including a sulfur-containing material, a binder, and a nitrogen-doped carbon material; and a protective layer that is disposed on the cathode active material layer and is composed of a nitrogen-doped carbon material, wherein the nitrogen-doped carbon material of the cathode active material layer has a form wherein spherical particles and linear structures are mixed and the nitrogen-doped carbon material of the protective layer has a linear structure.

The nitrogen-doped carbon material of the cathode active material layer may have a form wherein nitrogen-doped linear carbon-based materials form network structures and nitrogen-doped carbon-based materials with a spherical particle shape are arranged between the network structures. The nitrogen-doped linear carbon material of the protective layer may attain a network form.

A carbon-based material of the linear nitrogen-doped carbon material may include carbon nanotubes or vapor grown carbon fibers (VGCFs). A carbon-based material of the spherical nitrogen-doped carbon material may include acetylene black, carbon black, Ketjen black, or Denka black.

An —OR group (R is H or a C1 to C3 alkyl group) or —$NR_1R_2$ ($R_1$ and $R_2$ are each independently H or a C1 to C3 alkyl group) may be present on a side chain of the binder. The binder, on a side chain of which —$NR_1R_2$ is present, may include chitosan, carboxylic chitosan, polyethylenimine, polyaniline, or polyallylamine.

In accordance with another aspect of the present invention, there is provided a method of manufacturing the cathode for metal-sulfur batteries which includes a cathode active material layer, which contains nitrogen-doped carbon, and a protective layer. The method may include forming a cathode active material layer that containing a mixture of a nitrogen-doped linear carbon material and a nitrogen-doped spherical carbon material, a sulfur-containing material, and a binder; and laminating a protective layer on the cathode active material layer using a nitrogen-doped linear carbon material.

In the forming, the mixture of the nitrogen-doped linear carbon material and the nitrogen-doped spherical carbon material may be formed by mixing a carbon-based linear material with a carbon-based spherical material, followed by addition of a nitrogen material and then thermal treatment.

In the laminating, the nitrogen-doped linear carbon material may be prepared in a powder form and the prepared powder is sprayed on the cathode active material layer, followed by compressing into a film form.

A carbon-based material of the linear nitrogen-doped carbon material may include carbon nanotubes or vapor grown carbon fibers (VGCFs). A carbon-based material of the spherical nitrogen-doped carbon material may include acetylene black, carbon black, Ketjen black, or Denka black.

The nitrogen material may be melamine, urea, or ammonia gas.

An —OR group (R is H or a C1 to C3 alkyl group) or —$NR_1R_2$ ($R_1$ and $R_2$ are each independently H or a C1 to C3 alkyl group) may be present on a side chain of the binder. The binder, on a side chain of which —$NR_1R_2$ is present, may include chitosan, carboxylic chitosan, polyethylenimine, polyaniline, or polyallylamine.

BRIEF DESCRIPTION OF THE DRAWINGS

The above and other subjects, features, and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
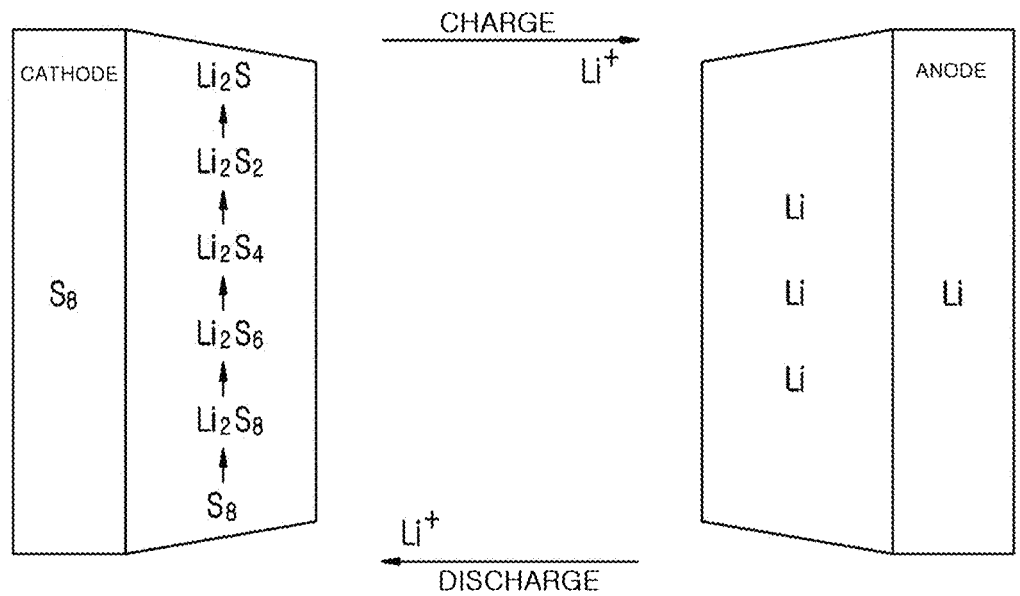
FIG. 1 is a schematic diagram illustrating the structure and reaction mechanism of a conventional lithium sulfur battery.

Exemplary embodiments of the present invention will be described in detail below with reference to the accompanying drawings.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims.

It will be understood that when a layer is referred to as being "on" another layer or a substrate, the layer may be formed directly on the other layer or the substrate, or an intervening layer may be present between the layer and the other layer or the substrate.

Figure 2:
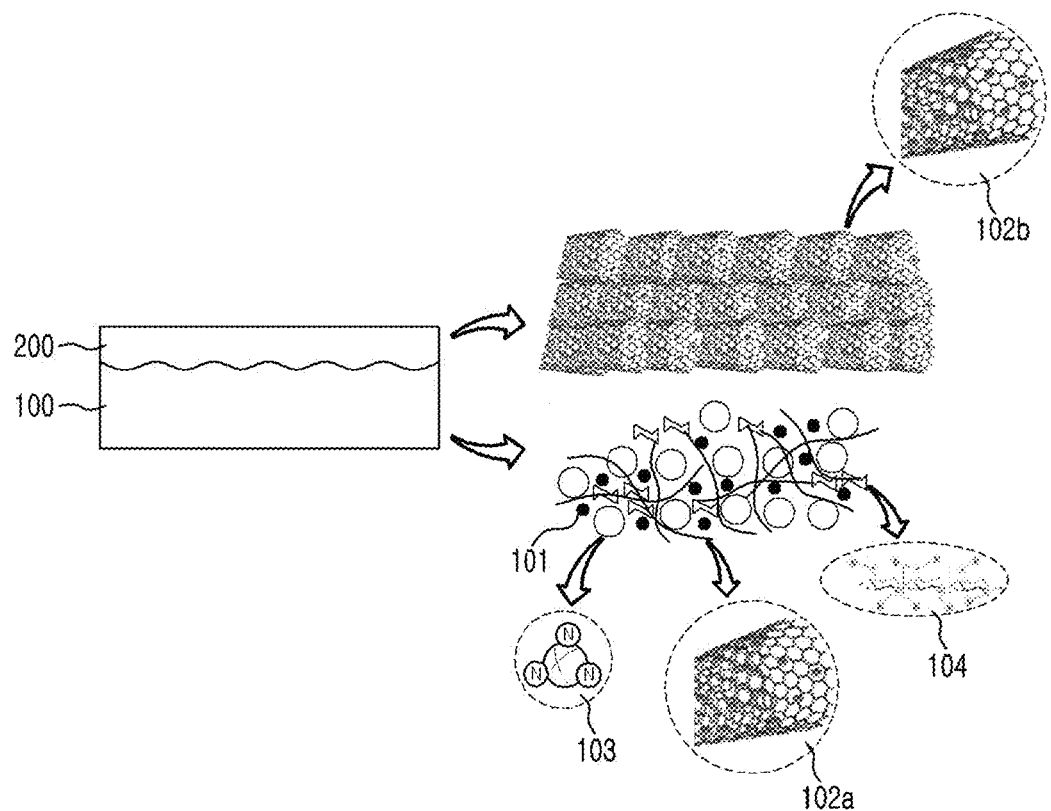
FIG. 2 is a sectional view illustrating the structure of a cathode for lithium-sulfur batteries according to an embodiment of the present invention.

FIG. 2 is a sectional view illustrating the structure of a cathode for lithium-sulfur batteries according to an embodiment of the present invention.

Referring to FIG. 2, a cathode active material layer 100 containing nitrogen-doped carbon materials 102a and 103, a sulfur-containing material 101, and a binder 104 may be formed.

To form the cathode active material layer 100, the nitrogen-doped carbon materials 102a and 103, the sulfur-containing material 101, and the binder 104 are mixed in a solvent, thereby preparing a cathode active material slurry. The active material slurry may include 100 to 400 parts by weight of the carbon materials 102a and 103 and 500 to 800 parts by weight of the sulfur-containing material 101 based on 100 parts by weight of the binder 104.

The prepared cathode active material slurry is applied on a substrate (not shown) or a current collector (not shown), thereby being formed in a film form. In an embodiment, the cathode active material slurry is applied on an aluminum foil and then vacuum dried to partially or completely remove the solvent. As a result, the cathode active material layer 100 may be formed. The thickness of the cathode active material layer 100 may be 1000 μm to 1400 μm.

The sulfur-containing material 101 may be elemental sulfur ($S_8$). In an embodiment, an elemental sulfur powder may be used as the sulfur-containing material 101.

The nitrogen-doped carbon materials 102a and 103 function as conductive materials enabling electrons to smoothly move in the cathode active material layer 100. For example, the nitrogen-doped carbon materials 102a and 103 may be porous materials having micropores.

The nitrogen-doped carbon materials 102a and 103 have a spherical or linear shape. In an embodiment, the nitrogen-doped carbon materials 102a and 103 may be a mixture of a nitrogen-doped spherical carbon particles 103 and a nitrogen-doped linear carbon particles 102a. In this case, the linear carbon particles 102a may be disposed between the spherical carbon particles 103, whereby the carbon particles 102a and 103 may be very densely arranged. Accordingly, sulfur-containing materials 101 may be disposed between the carbon particles 102a and 103 that are very densely arranged.

In other words, the nitrogen-doped carbon materials 102a and 103 have a network structure wherein the spherical particle-shaped carbon materials 103 are densely arranged in a network structure formed by the linear carbon materials 102a. Accordingly, structural stability may be increased.

In addition, since sulfur-containing materials 101 are not supported in the micropores of the carbon materials and are located between the high-density carbon materials 102a and 103, a decrease in conductivity may be prevented while delaying elution of metal polysulfide, as an intermediate product formed during discharge of a metal-sulfur battery, or sulfur into an electrolyte.

For example, the spherical carbon material may include acetylene black, carbon black, Ketjen black, or Denka black, but the present invention is not limited thereto. The linear carbon material may include carbon nanotubes or vapor grown carbon fibers (VGCFs), but the present invention is not limited thereto. In an embodiment, the spherical carbon material may be acetylene black, and the linear carbon material may be carbon nanotubes.

The acetylene black 103 may be mixed with carbon nanotubes 102a using a physical method. For example, the acetylene black 103 may be mixed with carbon nanotubes 102a using a mixer mill.

Meanwhile, nitrogen, with which the carbon materials 102a and 103 are doped, binds with metal ions ($M^+$) of the metal polysulfide, whereby an inhibitory effect on elution of the metal polysulfide into an electrolyte may be increased.

To dope a carbon material with nitrogen, first, the carbon material may be mixed with a nitrogen material. Here, the carbon material may be uniformly mixed with the nitrogen material using a physical method, e.g., using a mortar and a pestle.

In an embodiment, the carbon material and the nitrogen material may be mixed in a weight ratio of 1:100.

Subsequently, the mixed material is thermally treated, thereby preparing a carbon surface doped with nitrogen (N). Here, the temperature of the thermal treatment may be 600° C. to 1000° C.

A nitrogen (N) source which is the nitrogen material may be melamine, urea, chitin, chitosan, ammonia gas, or the like, but the present invention is not limited thereto. Particularly, melamine may be used as the N source.

The binder 104 is used to attach a cathode active material to a substrate or a current collector. For example, a polymer, particularly a nitrogen- or oxygen-containing polymer, may be used as the binder 104. For example, the binder 104 may be polyvinyl alcohol (PVC), polyethylene oxide, polyvinylpyrrolidone (PVP), or the like, but the present invention is not limited thereto.

The binder 104 may have, particularly, an —OR group (R is H or a C1 to C3 alkyl group) or —$NR_1R_2$ ($R_1$ and $R_2$ are each independently H or a C1 to C3 alkyl group) on a side chain thereof. The —OR group may be a hydroxyl group or an alkoxyl group. The —$NR_1R_2$ group may be a primary amine, a secondary amine, or a tertiary amine.

For example, the binder 104, on a side chain of which —$NR_1R_2$ is present, may include chitosan, carboxylic chitosan, polyethylenimine, polyaniline, or polyallylamine, but the present invention is not limited thereto.

Particularly, chitosan may be used as the binder 104. Since chitosan is a substance rich in OH and a $NH_2$ groups in an interior structure thereof, the OH and $NH_2$ groups bind with polysulfide, whereby an effect of delaying elution of the sulfur may be increased. In addition, the chitosan may enable sulfur to be more uniformly distributed in the cathode active material layer.

The solvent is not specifically limited so long as the nitrogen-doped carbon materials 102a and 103, the sulfur material 101, and the binder 104 may be uniformly dispersed and the solvent may be easily evaporated. Particularly, the solvent may be acetonitrile, methanol, ethanol, tetrahydrofuran, distilled water, isopropyl alcohol or dimethyl formamide.

Meanwhile, a protective layer 200 may be formed on the cathode active material layer 100. Particularly, after formation of the cathode active material layer 100, the protective layer 200 may be laminated on the cathode active material layer 100. The protective layer 200 may be a carbon film (netting carbon film) composed of a carbon material, particularly a nitrogen-doped carbon film.

For example, a carbon material of nitrogen-doped carbon constituting the protective layer 200 may be a carbon nanotube 102b. As described above, the affinity between a nitrogen group, with which the carbon nanotube 102b constituting the protective layer 200 is doped, and lithium ions of lithium polysulfide may further delay elution of sulfur in addition to sulfur elution delay due to the nitrogen-doped carbon materials 102a and 103 and binder 104 of the cathode active material layer 100 under the protective layer 200.

A method of forming the protective layer 200 may include preparing nitrogen-doped carbon nanotubes 102b in a powder form using the method described above such as physical mixing of nitrogen material with carbon nanotube; sprinkling the prepared powder on the cathode active material layer 100; and compressing the sprinkled powder into a film which is laminated on the cathode active material layer 100. Accordingly, the protective layer 200 may be formed in a form wherein nitrogen-doped carbon nanotubes 102b are intertwined with each other like a network form. In addition, because the protective layer 200 is formed by compressing the nitrogen-doped carbon nanotube powder sprinkled on the cathode active material layer 100, the nitrogen-doped carbon nanotube powder can enter into voids present in a relatively uneven surface of the cathode active material layer 100 and the protective layer 200 can, therefore, fill the voids, thereby increasing structural stability of a prepared cathode.

Hereinafter, the present invention will be described in detail by describing exemplary embodiments of the invention with reference to the attached drawings. However, the scope of the present invention is not limited to the embodiments described in the present specification and may be embodied in other forms.

PREPARATION EXAMPLE 1

Nitrogen-doped Carbon Material 50 mg of acetylene black and 5 g of melamine were fed into a mortar and were uniformly mixed. Subsequently, thermal treatment was performed at 900□ for two hours in an argon gas atmosphere, thereby preparing a nitrogen-doped carbon material.

PREPARATION EXAMPLE 2

Nitrogen-doped Carbon Material 50 mg of carbon nanotubes and 5 g of melamine were fed into a mortar and uniformly mixed. Subsequently, thermal treatment was performed at 900□ for two hours in an argon gas atmosphere, thereby preparing a nitrogen-doped carbon material.

PREPARATION EXAMPLE 3

Nitrogen-doped Carbon Material 25 mg of acetylene black and 25 mg of carbon nanotubes were uniformly mixed using a mixer mill. Subsequently, 50 mg of a resultant carbon material mixture was mixed with 5 g of melamine using a pestle and a mortar, followed by thermally treating at 900□ for two hours in an argon gas atmosphere. As a result, a nitrogen-doped carbon material was prepared.

PREPARATION EXAMPLE 4

Preparation of Cathode Active Material Layer

A nitrogen-doped carbon material was prepared according to Preparation Example 3 described above. Subsequently, a sulfur powder, the nitrogen-doped carbon material, and chitosan were respectively added in amounts of 60% by weight, 30% by weight, 10% by weight to an aqueous acetic acid solution, followed by mixing and dispersion. As a result, a slurry was prepared. Subsequently, the slurry was spread on an aluminum foil and was dried overnight in a 50□ vacuum oven, thereby forming a cathode active material layer.

PREPARATION EXAMPLE 5

Preparation of Cathode Active Material Layer and Protective Layer

Nitrogen-doped carbon nanotubes were prepared according to Preparation Example 2, and then were prepared in a powder form. This powder was sprinkled on the cathode active material layer prepared according to Preparation Example 4, followed by compressing into a film form. As a result, a protective layer was prepared.

PREPARATION EXAMPLE 6

Preparation of Cathode Active Material Layer and Protective Layer

A cathode active material layer and a protective layer were prepared in the same manner as in Preparation Example 5, except that the amount of sulfur loaded in the cathode active material layer was increased to 10 mg/cm$^2$.

COMPARATIVE EXAMPLE 1

Preparation of Cathode Active Material Layer and Protective Layer

A cathode active material layer and a carbon film were prepared in the same manner as in Preparation Example 5, except that polyvinylidene fluoride (PVdF), instead of chitosan, was used as a binder and the carbon material of the protective layer was not doped with nitrogen.

COMPARATIVE EXAMPLE 2

Preparation of Cathode Active Material Layer and Protective Layer

A cathode active material layer and a carbon film were prepared in the same manner as in Preparation Example 5, except that the carbon material of the protective layer was not doped with nitrogen.

COMPARATIVE EXAMPLE 3

Preparation of Cathode Active Material Layer and Protective Layer

A cathode active material layer and a protective layer were prepared in the same manner as in Preparation Example 5, except that PVdF, instead of chitosan, was used as a binder.

|  | Cathode active material layer | | | | Carbon film | |
|---|---|---|---|---|---|---|
|  | Carbon material | Doping with nitrogen | a binder | Others | Carbon material | Doping with nitrogen |
| Preparation Example 1 | Acetylene black | ○ | — | — | — | — |
| Preparation Example 2 | Carbon nanotubes | ○ | — | — | — | — |
| Preparation Example 3 | Acetylene black + carbon nanotubes | ○ | — | — | — | — |
| Preparation Example 4 | Acetylene black + carbon nanotubes | ○ | Chitosan | — | — | — |
| Preparation Example 5 | Acetylene black + carbon nanotubes | ○ | Chitosan | — | Carbon nanotubes | ○ |
| Preparation Example 6 | Acetylene black + carbon nanotubes | ○ | Chitosan | Sulfur loading amount increased | Carbon nanotubes | ○ |
| Comparative Example 1 | Acetylene black + carbon nanotubes | ○ | PVdF | — | Carbon nanotubes | X |
| Comparative Example 2 | Acetylene black + carbon nanotubes | ○ | Chitosan | — | Carbon nanotubes | X |
| Comparative Example 3 | Acetylene black + carbon nanotubes | ○ | PVdF | — | Carbon nanotubes | ○ |

EXPERIMENTAL EXAMPLE 1

Comparison of Polysulfide Elution Amounts Dependent Upon Nitrogen-doping of Carbon Material A lithium polysulfide aqueous solution (control group), a mixed solution of lithium polysulfide aqueous solution and carbon nanotubes non-doped with nitrogen (Experimental Group 1), a mixed solution of lithium polysulfide aqueous solution and the nitrogen-doped carbon nanotubes of Preparation Example 2 (Experimental Group 2), a mixed solution of lithium polysulfide aqueous solution and acetylene black non-doped with nitrogen (Experimental Group 3), and a mixed solution of lithium polysulfide aqueous solution and the nitrogen-doped acetylene black of Preparation Example 1 (Experimental Group 4) were respectively prepared. Subsequently, each of the solutions was filtered through a syringe filter. The concentration of polysulfide in a resultant filtrate was measured by ultraviolet visible light spectroscopy.

Figure 3A:
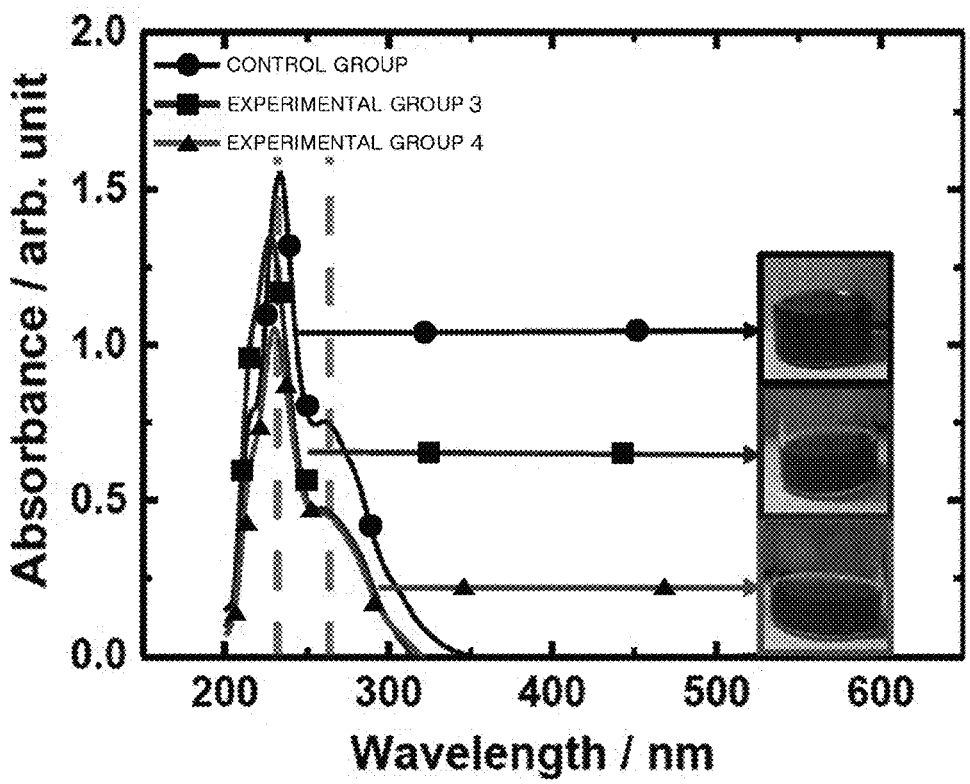
FIGS. 3A and 3B are graphs illustrating a result according to Experimental Example 1 of the present invention.
Figure 3B:
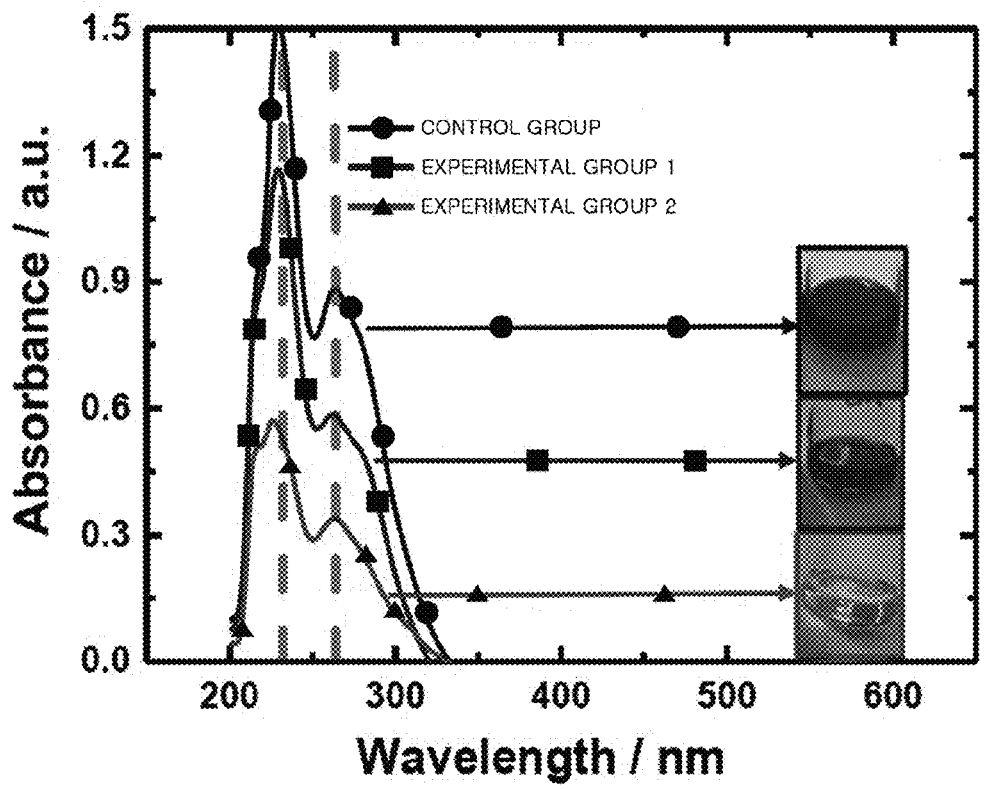

FIGS. 3A and 3B are graphs illustrating results according to Experimental Example 1 of the present invention.

Referring to FIG. 3A, it can be confirmed that a polysulfide peak observed for the mixed solution (Experimental Group 3) of lithium polysulfide and acetylene black non-doped with nitrogen is lower than that of the polysulfide solution (control group). Accordingly, it can be confirmed that carbon of the acetylene black adsorbs polysulfide, thereby delaying elution of the polysulfide. In addition, it can be confirmed that a polysulfide peak observed for the mixed solution (Experimental Group 4) of lithium polysulfide and the nitrogen-doped acetylene black of Preparation Example 1 is much lower than that for the control group. Accordingly, it can be confirmed that, when nitrogen is present along with carbon like in the nitrogen-doped acetylene black, polysulfide adsorption ability further increases, thereby further delaying elution of the polysulfide.

Referring to FIG. 3B, it can be confirmed that a polysulfide peak observed for the mixed solution (Experimental Group 1) of lithium polysulfide and carbon nanotubes non-doped with nitrogen is about 20% lower than that for the polysulfide solution (control group), as in FIG. 3A. Accordingly, it can be confirmed that carbon of the carbon nanotubes adsorbs polysulfide, thereby delaying elution of the polysulfide. In addition, it can be confirmed that a polysulfide peak observed for the mixed solution (Experimental Group 2) of lithium polysulfide and the nitrogen-doped carbon nanotubes of Preparation Example 2 is about 61% lower than that for the control group. Accordingly, it can be confirmed that, when nitrogen is present along with carbon like in the nitrogen-doped carbon nanotubes, polysulfide adsorption ability increases, thereby further delaying elution of the polysulfide Referring to FIGS. 3A and 3B together, it can be confirmed that, when the nitrogen-doped carbon nanotubes are compared with the nitrogen-doped acetylene black, the nitrogen-doped carbon nanotubes exhibit a superior effect in delaying elution of polysulfide.

EXPERIMENTAL EXAMPLE 2

Chitosan Binder Effect Comparison

A lithium polysulfide aqueous solution (control group) in which lithium polysulfide and distilled water (DI water) are mixed, a mixed solution of lithium polysulfide aqueous solution and a PVdF binder (Experimental Group 5), and a mixed solution of lithium polysulfide aqueous solution and a chitosan binder (Experimental Group 6) were prepared. Subsequently, each of the solutions was filtered through a syringe filter. The concentration of polysulfide in a resultant filtrate was measured by ultraviolet visible light spectroscopy.

EXPERIMENTAL EXAMPLE 2-1

Chitosan Binder Effect Comparison

To prepare slurries, sulfur and a chitosan binder were dispersed in a solvent (DI-water) (Experimental Group 7), and sulfur and a PVdF binder were dispersed in a solvent (N-Methylpyrrolidone, NMP) (Experimental Group 8). Subsequently, dispersion forms of resultant slurries were observed by means of an optical microscope. In addition, zeta potentials of the slurries were observed. Meanwhile, the nitrogen-doped carbon material (carbon nanotubes and acetylene black) prepared according to Preparation Example 3 was added as a conductive material to each of the slurries of Experimental Groups 7 and 8, thereby additionally preparing slurries. Dispersion forms of the additionally prepared slurries were also observed by means of an optical microscope. In addition, zeta potentials of these slurries were measured.

Figure 4:
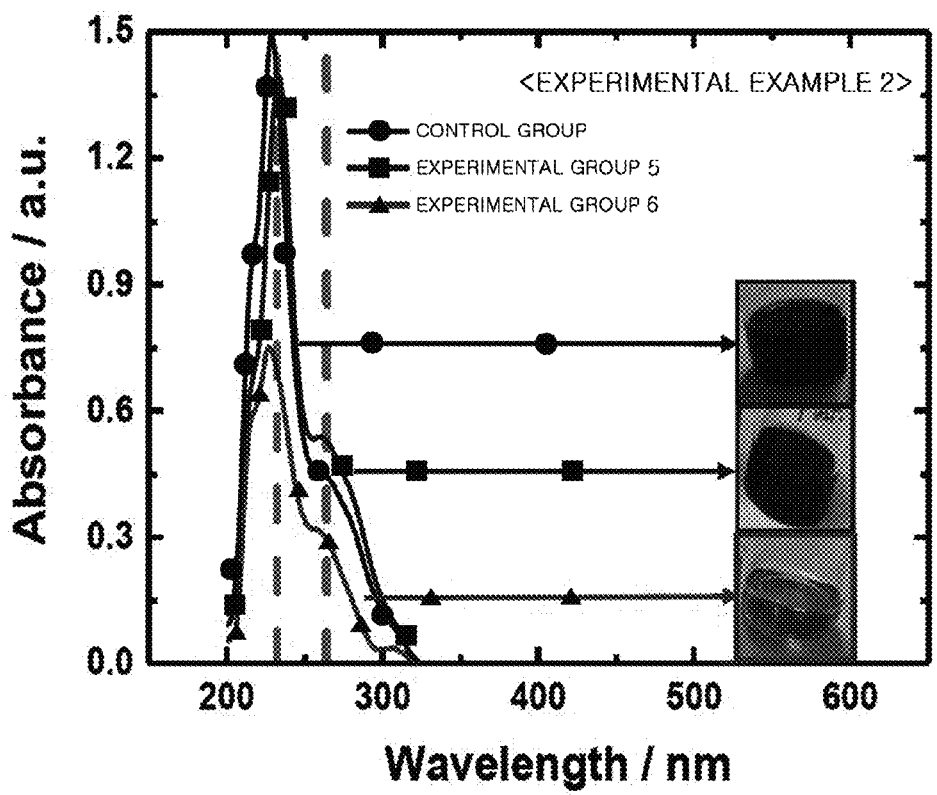
FIG. 4 is a graph illustrating a result according to Experimental Example 2 of the present invention.

FIG. 4 is a graph illustrating a result according to Experimental Example 2 of the present invention.

Referring to FIG. 4, it can be confirmed that a polysulfide peak of the mixed solution (Experimental Group 6) of lithium polysulfide and a chitosan binder is lower than those of the lithium polysulfide aqueous solution (control group) and the mixed solution (Experimental Group 5) of lithium polysulfide and a PVdF binder. This result may indicate that OH and $NH_2$ groups of the chitosan increase adsorption ability of the polysulfide, thereby delaying elution of the polysulfide into an electrolyte.

FIGS. 5A to 5D are graphs illustrating results according to Experimental Example 2-1 of the present invention.

Figure 5A:
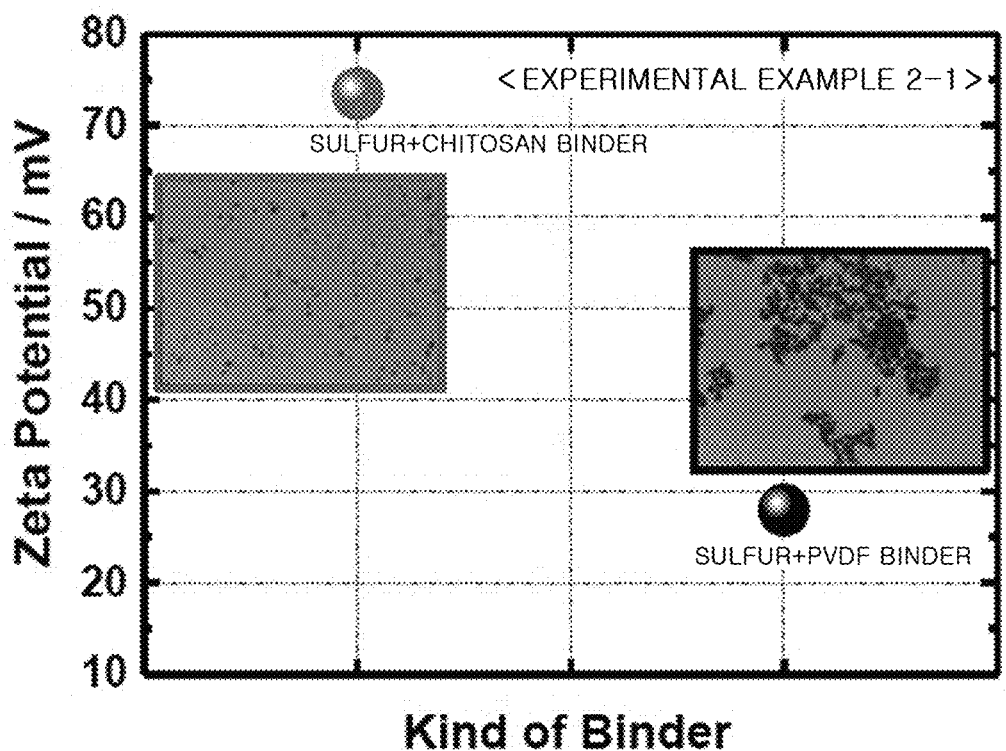
FIGS. 5A to 5D are graphs illustrating results according to Experimental Example 2-1 of the present invention.
Figure 5B:
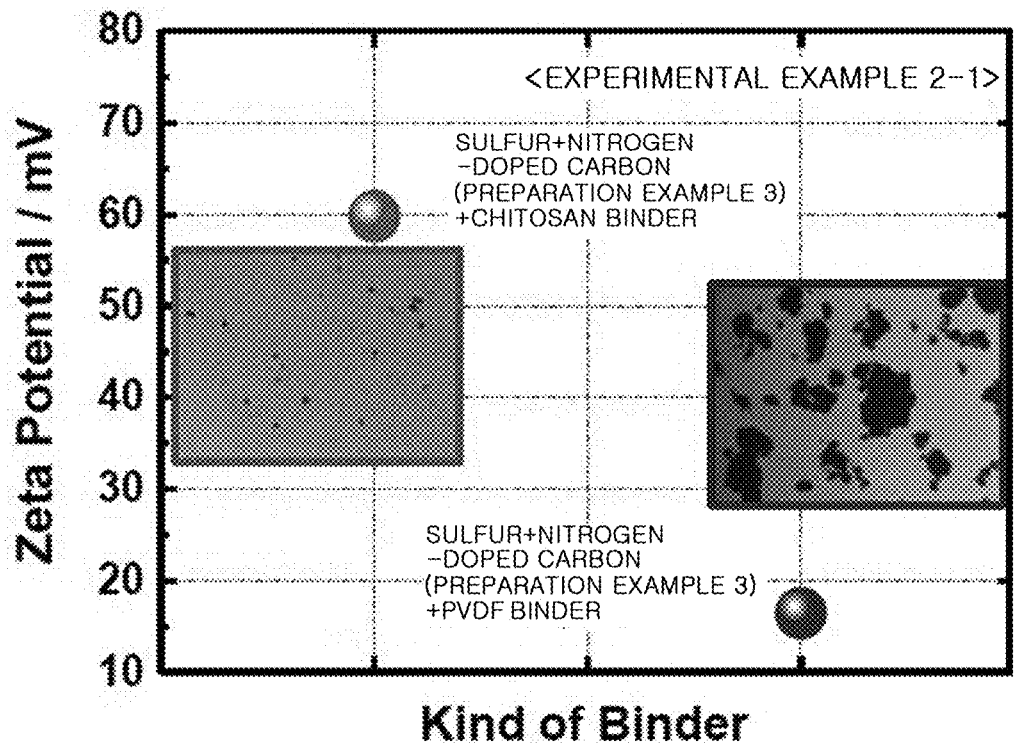

Referring to FIGS. 5A and 5B, it can be confirmed that all of slurries, to which a chitosan binder was added, exhibit higher zeta potentials, compared to slurries to which a PVdF binder was added. That is, it can be confirmed that the dispersions of the slurries, to which a chitosan binder was added, are higher than those of the slurries to which a PVdF binder was added. Accordingly, it can be confirmed that the chitosan binder enables sulfur to be more uniformly distributed in the slurry.

Figure 5C:
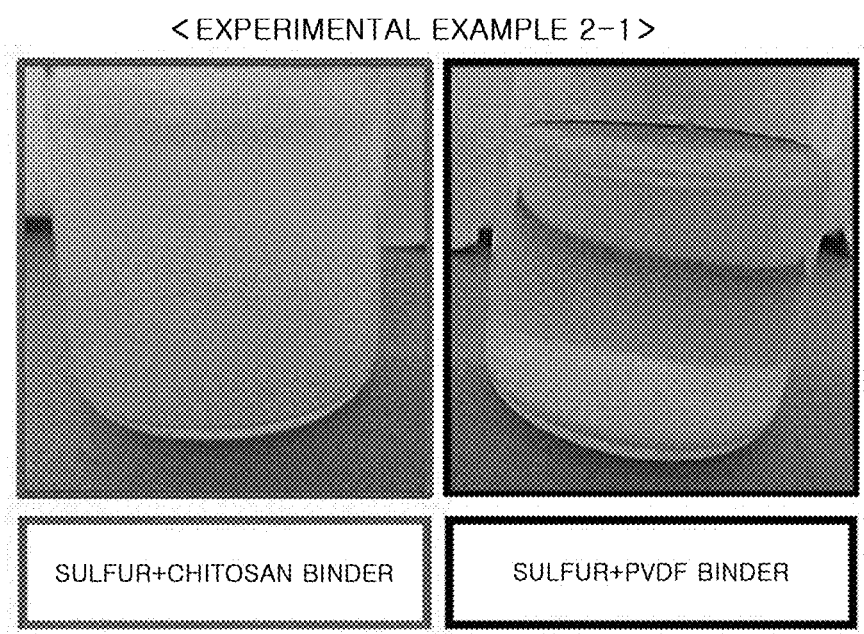
Figure 5D:
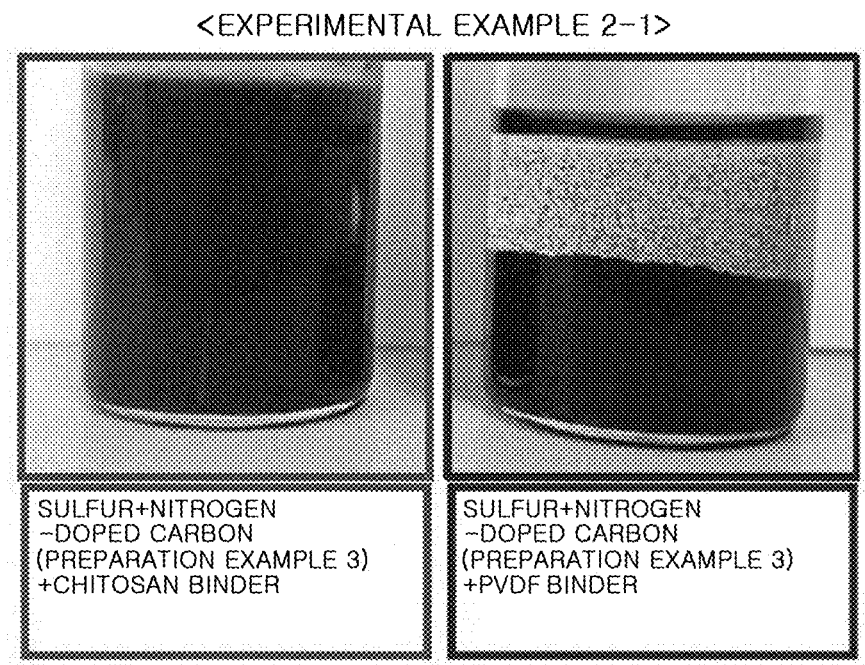

Referring to FIGS. 5C and 5D, it can be confirmed that materials are uniformly dispersed in all of the slurries to which a chitosan binder is added, whereas a layered structure is formed in the slurries to which a PVdF binder was added.

Figure 6:
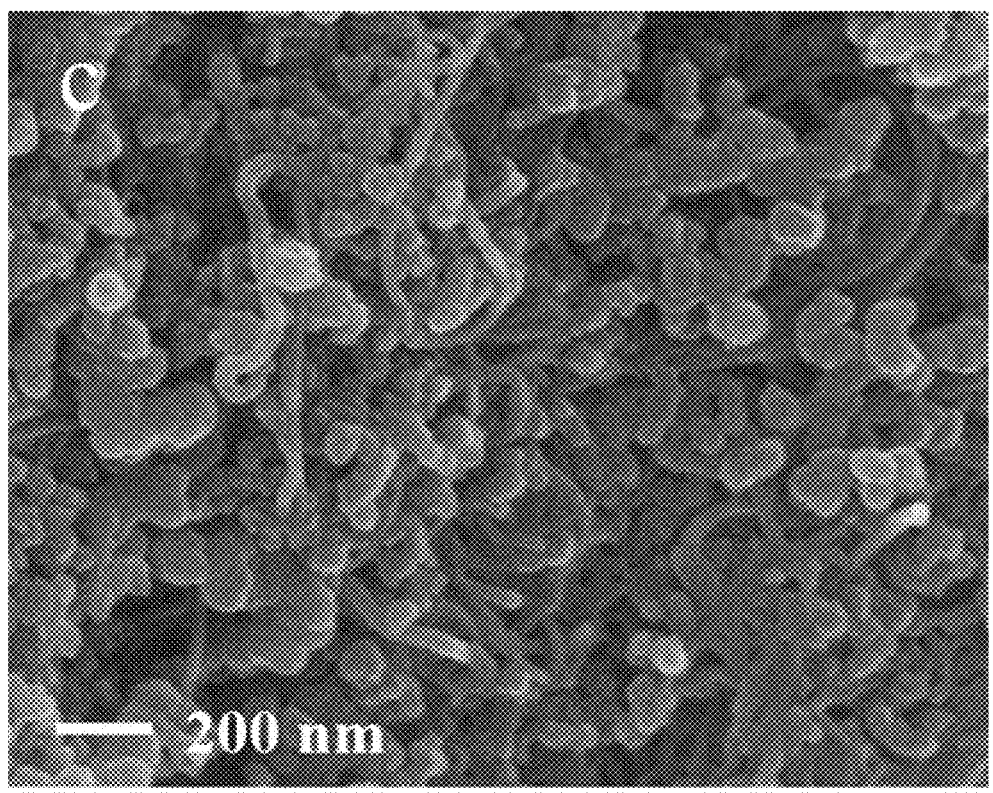
FIG. 6 is a TEM photograph illustrating a cathode active material layer according to Preparation Example 4 of the present invention.

FIG. 6 is a TEM photograph illustrating a cathode active material layer according to Preparation Example 4 of the present invention.

Referring to FIG. 6, it can be confirmed that the cathode active material layer has a form wherein spherical nitrogen-doped carbon materials and linear nitrogen-doped carbon materials are mixed.

Figure 7A:
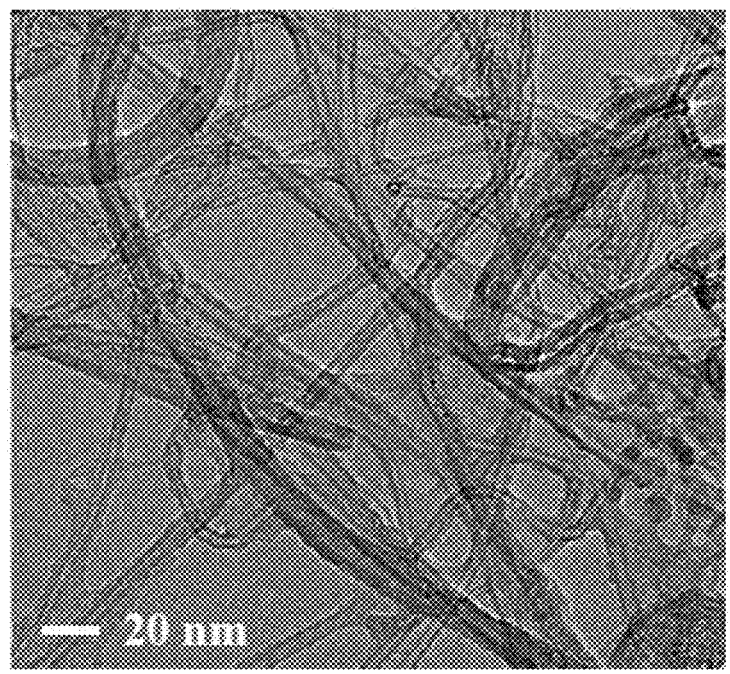
FIG. 7A is a TEM photograph illustrating a protective layer according to Preparation Example 5 of the present invention.
Figure 7B:
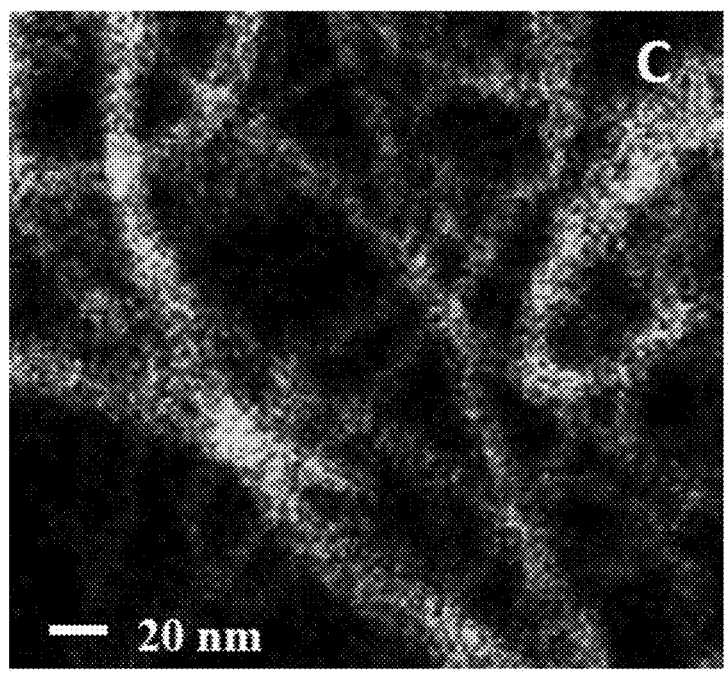
FIGS. 7B to 7D are energy dispersive X-ray (EDX) spectrograms illustrating the distribution of elements in a protective layer according to Preparation Example 5 of the present invention.
Figure 7C:
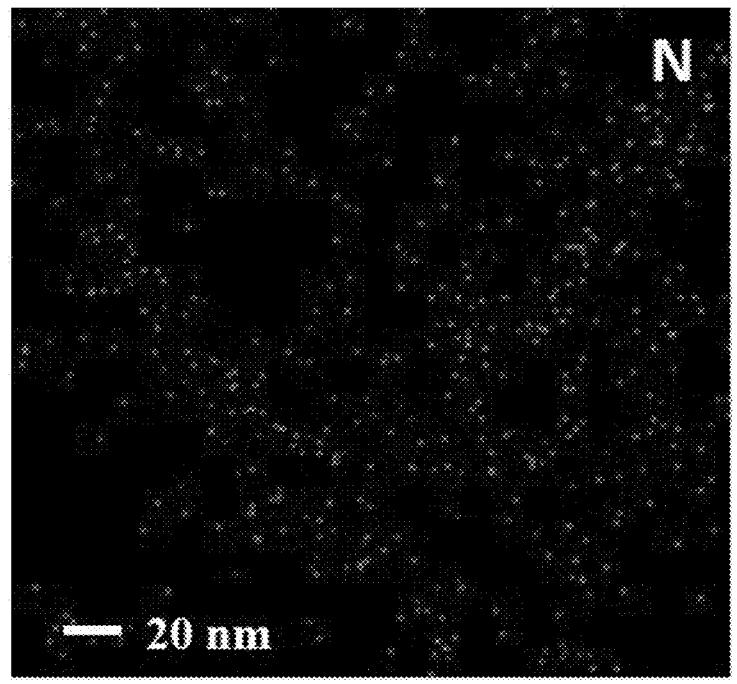
Figure 7D:
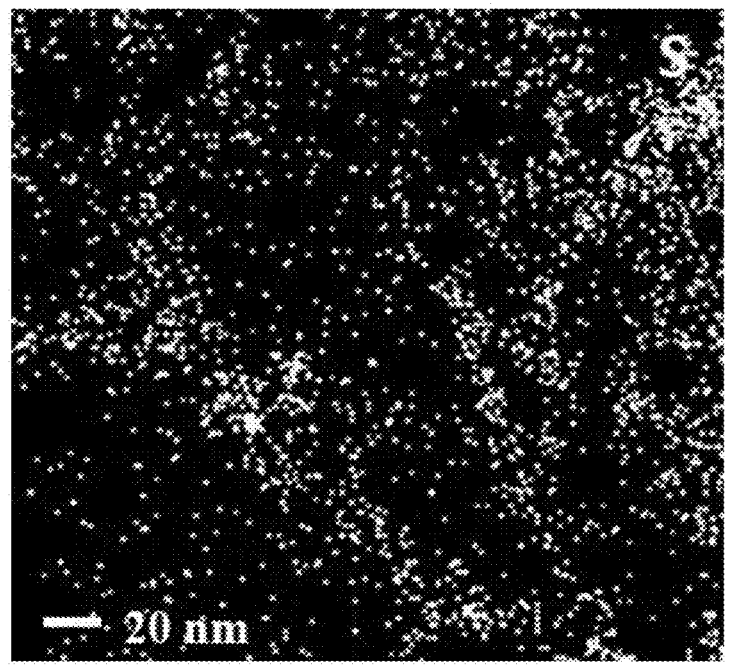

FIG. 7A is a TEM photograph illustrating a protective layer according to Preparation Example 5 of the present invention, and FIGS. 7B to 7D are energy dispersive X-ray (EDX) spectrograms illustrating the distribution of elements in a protective layer according to Preparation Example 5 of the present invention. The EDX images of the protective layers were obtained after 50 charge/discharge cycles.

Referring to FIG. 7A, it can be confirmed that the protective layer has a form wherein nitrogen-doped linear carbon materials are entangled with each other like a network.

Referring to FIGS. 7A to 7D, it can be confirmed that carbon distribution is the same in the carbon nanotubes of a nitrogen-doped carbon material constituting the protective layer (FIG. 7B). In addition, it can be confirmed that nitrogen is distributed along the network structure of the carbon nanotubes (FIG. 7C). From these results, it can be confirmed that surfaces of the carbon nanotubes are doped with nitrogen.

Meanwhile, although it can be confirmed that elemental sulfur is distributed in areas in which the carbon nanotubes are not located, it is mainly distributed along the network structure of the carbon nanotubes (FIG. 7D). This result may indicate that the nitrogen-doped carbon nanotubes prevent elution of sulfur.

Figure 8A:
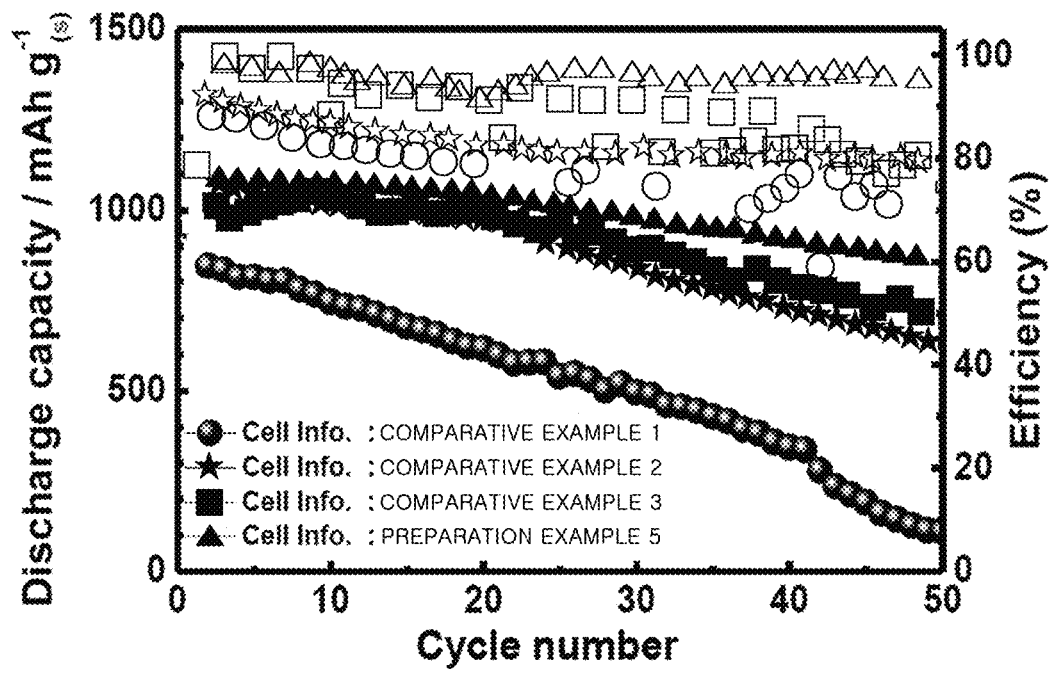
FIGS. 8A and 8B are graphs illustrating charge/discharge characteristics and a discharge capacity of a metal-sulfur battery, which includes a cathode according to each of Preparation Example 5 of the present invention and Comparative Examples 1, 2 and 3, dependent upon a cycle number.
Figure 8B:
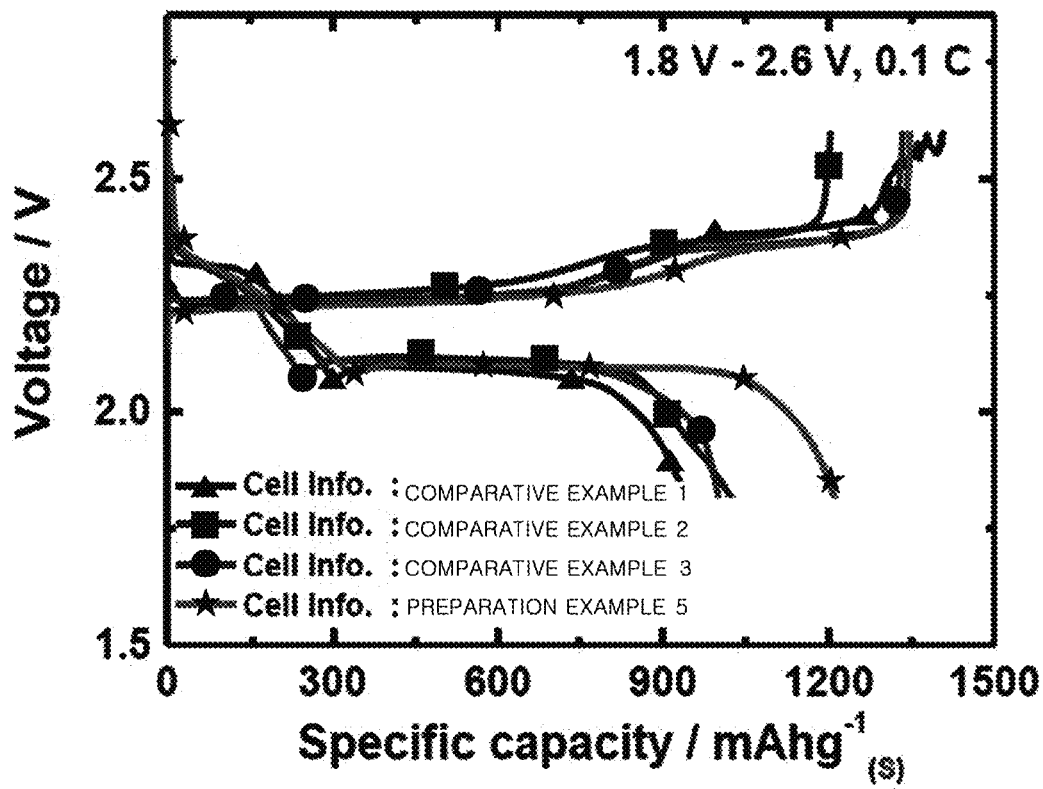

FIGS. 8A and 8B are graphs illustrating the charge/discharge characteristics and a discharge capacity of a metal-sulfur battery, which includes a cathode according to each of Preparation Example 5 of the present invention and Comparative Examples 1, 2 and 3, dependent upon a cycle number. Here, a lithium foil was used as an anode of the metal-sulfur battery, and a mixed solution of dimethoxyethane, 1,3-dioxolane, lithium bis(trifluoromethanesulfonyl) imide (LiTFSI), and lithium nitrate ($LiNO_3$) was used as an electrolyte. In addition, charging was performed up to 2.6 V, discharging was performed to 1.8 V, and 50 charge/discharge cycles were performed.

Referring to FIGS. 8A and 8B, it can be confirmed that, in the case of Preparation Example 5, an initial capacity is 1241 $mAhg^{-1}$, 95% efficiency is maintained during 50 charge/discharge cycles, and a cycle retention is 85%, which indicates excellent stability.

Figure 9:
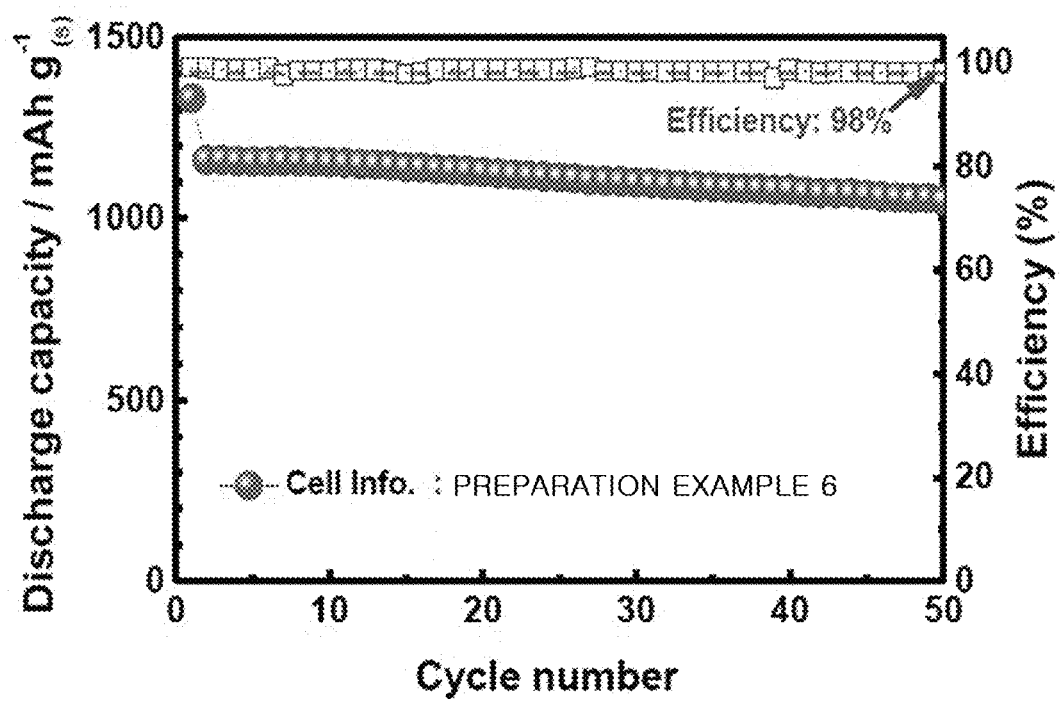
FIG. 9 illustrates graphs of charge/discharge characteristics and a discharge capacity of a metal-sulfur battery, which includes a cathode according to Preparation Example 6 of the present invention, dependent upon a cycle number.

FIG. 9 illustrates graphs of the charge/discharge characteristics and a discharge capacity of a metal-sulfur battery, which includes a cathode according to Preparation Example 6 of the present invention, dependent upon a cycle number.

Referring to FIG. 9, it can be confirmed that, even when a loading amount of sulfur increases, an initial discharge capacity is 1332 $Ah\ g^{-1}$, an efficiency of 98% is exhibited after 50 charge/discharge cycles, and a cycle retention is 91%, which indicates very superior performance.

As apparent from the above description, the present invention provides a cathode for lithium-sulfur batteries that includes a cathode active material layer, which includes nitrogen-doped carbon, and a protective layer. Accordingly, elution of sulfur may be sufficiently delayed although a loading amount of the sulfur is increased, thereby improving the capacity and lifespan characteristics of a battery.

It will be understood that technical effects of the present invention are not limited to those mentioned above and other unmentioned technical effects will be clearly understood by those skilled in the art from the above description.

Meanwhile, embodiments of the present invention disclosed in the present specification and drawings are only provided to help understanding of the present invention and the present invention is not limited to the embodiments. It will be apparent to those skilled in the art that various modifications can be made to the above-described exemplary embodiments of the present invention without departing from the spirit or scope of the invention.

What is claimed is:

1. A cathode for lithium-sulfur batteries, comprising:
   a cathode active material layer comprising a sulfur-containing material, a binder, and a nitrogen-doped carbon material; and
   a protective layer that is disposed on the cathode active material layer and contains a nitrogen-doped linear carbon material,
   wherein the nitrogen-doped carbon material of the cathode active material layer comprises a mixture of a linear nitrogen-doped carbon material forming network structure and a spherical nitrogen-doped carbon material arranged in the network structure.

2. The cathode according to claim 1, wherein the nitrogen-doped linear carbon material of the protective layer forms a network structure.

3. The cathode according to claim 1, wherein the linear nitrogen-doped carbon material in the cathode active material layer comprises nitrogen-doped carbon nanotubes or nitrogen-doped vapor grown carbon fibers (VGCFs).

4. The cathode according to claim 1, wherein the spherical nitrogen-doped carbon material in the cathode active material layer comprises nitrogen-doped acetylene black, nitrogen-doped carbon black, nitrogen-doped Ketjen black, or nitrogen-doped Denka black.

5. The cathode according to claim 1, wherein an —OR group or —$NR_1R_2$ is present on a side chain of the binder, in which R is H or a C1 to C3 alkyl group, and $R^1$ and $R^2$ are each independently H or a C1 to C3 alkyl group.

6. The cathode according to claim 5, wherein the binder, on a side chain of which —$NR_1R_2$ is present, comprises chitosan, carboxylic chitosan, polyethylenimine, polyaniline, or polyallylamine.

* * * * *